(12) United States Patent
Berly et al.

(10) Patent No.: US 8,531,960 B2
(45) Date of Patent: Sep. 10, 2013

(54) METHOD AND SYSTEM OF USING COUNTERS TO MONITOR A SYSTEM PORT BUFFER

(75) Inventors: Mark Berly, Pittsboro, NC (US); Douglas Alan Gourlay, San Jose, CA (US); Danny Tak Hong Khoo, Union City, CA (US); John Sabasteanski, Brooklyn, NY (US)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 13/099,286

(22) Filed: May 2, 2011

(65) Prior Publication Data
US 2011/0205893 A1   Aug. 25, 2011

Related U.S. Application Data

(63) Continuation of application No. 11/386,955, filed on Mar. 21, 2006, now Pat. No. 7,974,196.

(51) Int. Cl.
*H04L 1/00* (2006.01)

(52) U.S. Cl.
USPC ............ 370/235; 370/412; 370/420; 370/429

(58) Field of Classification Search
USPC ................ 370/412, 413, 414, 415, 416, 417, 370/418
See application file for complete search history.

(56) References Cited

U.S. PATENT DOCUMENTS

| | | | |
|---|---|---|---|
| 5,809,078 A | 9/1998 | Tani et al. | |
| 6,493,318 B1 * | 12/2002 | Bare | 370/238 |
| 7,120,683 B2 * | 10/2006 | Huang | 709/223 |
| 8,185,653 B2 * | 5/2012 | Yau et al. | 709/238 |

| | | |
|---|---|---|
| 2002/0089931 A1 | 7/2002 | Takada et al. |
| 2002/0129300 A1 | 9/2002 | Floyd et al. |
| 2002/0141403 A1 | 10/2002 | Akahane et al. |
| 2004/0168100 A1 | 8/2004 | Thottan et al. |
| 2005/0053073 A1 | 3/2005 | Kloth et al. |
| 2005/0201369 A1 | 9/2005 | Horie |
| 2005/0216573 A1 | 9/2005 | Gutjahr |
| 2006/0005007 A1 | 1/2006 | Sharma |
| 2006/0059163 A1 | 3/2006 | Frattura et al. |

FOREIGN PATENT DOCUMENTS

| | | |
|---|---|---|
| EP | 1351441 | 10/2003 |
| WO | 0163838 | 8/2001 |

OTHER PUBLICATIONS

International Searching Authority USPTO; International Search Report for PCT/US07/64340; May 6, 2008.
International Searching Authority USPTO; Written Opinion for PCT/US07/64340; May 6, 2008. Li-Chiou, Chen, Characterization of defense mechanisms against distributed denial of service attacks, Computers & Security, Elsevier Science Publishers. Amsterdam, NL, vol. 23 No. 8. Dec. 1, 2004, pp. 665-678.
European Patent Office, Extended European Search Report, for EP Application No. 07758850, Applicant Cisco Technology, Inc. Dated Mar. 30, 2010.

\* cited by examiner

*Primary Examiner* — Alvin Zhu
(74) *Attorney, Agent, or Firm* — Merchant & Gould

(57) ABSTRACT

Methods and systems for using counters to monitor port buffers are described. In one embodiment, the method includes receiving data packets into a system port buffer having different queues. Also, counters are associated with the queues. Further, the method includes scanning the counters, in which the counters count the number of dropped data packets associated with an individual queue of the different queues. Moreover, the method includes determining if the number of dropped data packets for an individual queue is greater than a predetermined number. If the number of dropped data packets is greater than the predetermined number, then a message is generated.

20 Claims, 4 Drawing Sheets

METHOD AND SYSTEM OF USING COUNTERS TO MONITOR A SYSTEM PORT BUFFER

This application is a continuation of U.S. patent application Ser. No. 11/386,955 filed Mar. 21, 2006 now U.S. Pat. No. 7,974,196, titled "METHOD AND SYSTEM OF USING COUNTERS TO MONITOR A SYSTEM PORT BUFFER", the disclosure of which is incorporated herein by reference in its entirety.

TECHNICAL FIELD

The present invention generally relates to monitoring of system port buffers, and in particular to using counters to monitor system port buffers.

BACKGROUND

For a variety of reasons, a user may subscribe to multiple data feeds. For example, traders in the financial community often subscribe to different market data feeds in order to receive news relevant to trading decisions. One perceived advantage of doing so is that the trader may gain a wider perspective by analyzing news from different sources and thus improve the trader's performance.

Consequently, when a major event occurs, a network data delivery device, e.g., a switch or a router, often receives a significant increase in network traffic. Because different traders often subscribe to the same event, a multicast delivery method is frequently used. In contrast to unicast delivery methods, which when used to deliver to multiple recipients sends a duplicate of the data stream from the sender to each recipient; multicast delivery method generates only a single data stream and utilizes a multicast-enabled system, e.g., a router, to duplicate data at the multicast-enabled system and forward duplicated data streams to receivers.

Thus, because duplication occurs at the multicast-enabled system instead of at the sender, efficiency is improved. However, when a major event occurs, a data stream may be duplicated hundreds or thousands of times at the multicast-enabled system. In some situations, the outgoing data stream may overload the egress system port buffers and cause data packets to be dropped, which in turn may adversely affect a downstream end-user's application program, such as causing a desktop trading application program, to crash or malfunction.

DETAILED DESCRIPTION

Figure 1:
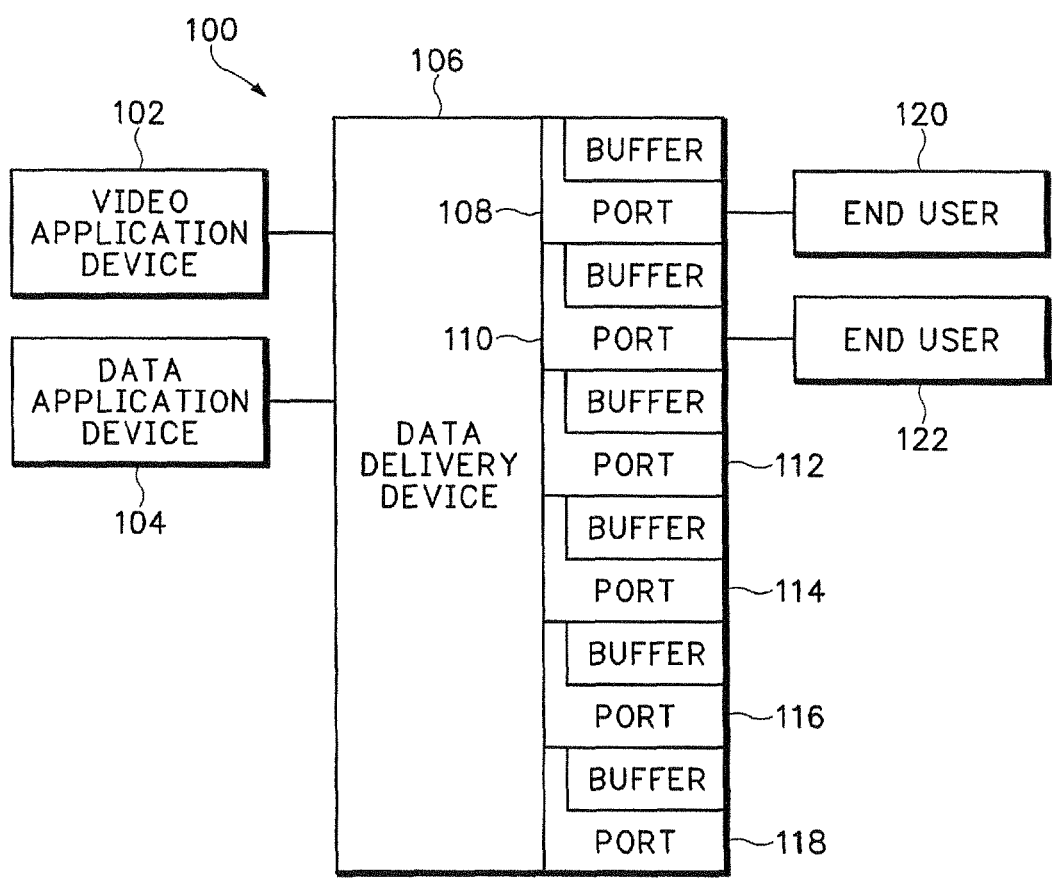
FIG. 1 illustrates a block diagram of an example of a system upon which embodiments in accordance with the present invention may be implemented.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

A network data delivery device, such as a router or a switch, often receives a significant increase in network traffic when particular events happen. For example, a major news event that affects financial traders can cause network traffic to increase several fold.

Unfortunately, an increase in network traffic, if not handled suitably, can overload the network data delivery device and cause data packets to be dropped, which in turn can cause a downstream end-user's application program to crash or malfunction.

Hence, to compensate for this sudden increase in network traffic, usually the network data delivery device's output ports are equipped with system port buffers. Thus, when an increase in network traffic occurs, if needed, some data packets may be temporarily directed into the system port buffer.

However, although in some situations having system port buffers can adequately compensate for a sudden increase in network traffic, a more drastic increase in network traffic, e.g., caused by multicasting, can overload the system port buffer and cause data packets to be dropped.

In order to detect the source of the problem, a method of monitoring the system port buffers is needed. Embodiments below describe in detail methods of using counters to monitor the system port buffer and determine the source of the data packets that is causing the system port buffer to overload.

Frequently, an individual system port buffer is sub-divided into different queues that receive incoming data packets from different sources. For example, one queue may be designated to receive data packets from a video application device and another queue may be designated to receive data packets from a data application device.

In one embodiment, if a data packet is dropped, the queues have associated counters, e.g., a tail drop counter that counts and records the number of dropped data packets for its associated queue of the system port buffer.

Therefore, by scanning the counters, the number of dropped data packets associated with an individual queue is known. Moreover, if it is determined that the number of dropped data packets for a queue is greater than a predetermined number, e.g., zero, then a message is generated and can be sent to a network management station and/or an end user.

Further, in one embodiment, the source of the dropped data packets is determined by forwarding subsequent incoming data packets to a different system port buffer that is not overloaded. This is because if a subsequent incoming data packet is not forwarded and simply dropped; all information regarding that data packet may be lost, which makes determination of its source difficult. As a result, by forwarding the data packet and storing it on the non-overloaded system port buffer, the data packet can be accessed and its source may be determined. Furthermore, if the source of the data packets that is causing the system port buffer to overload can be determined, then a network administrator may be able to take corrective actions.

Also, in another embodiment, the source of the dropped data packets is determined by forwarding all incoming data packets before more than a predetermined number of data packets have been dropped into a network analysis module (NAM), and terminating this forwarding upon notice that more than a predetermined number of data packets have been dropped. This is because a network analysis module (NAM) has a limited buffer size, and thus as newer data packets are received by the NAM, older data packets are overwritten. Accordingly, by terminating forwarding immediately after a predetermined number, e.g., zero, of data packets have been dropped, the data packets that caused the overload is usually still in the NAM buffer and not yet overwritten.

For example, by actively running a Switched Port Analyzer (SPAN) session to a NAM and disabling the SPAN session upon a microburst, the affected port can be determined and a SYSLOG can be generated. Moreover, the network traffic in the buffer and/or the network traffic enqueued at the time of buffer overflow may be determined.

Thus, by taking a more active approach in identifying problems, e.g., microburst, that cause system port buffers to overload, a network administrator may be able to reduce down-time and bring affected devices, such as a workstation, back to an operating state more quickly.

FIG. 1 illustrates a block diagram of an example of a system 100 upon which embodiments in accordance with the present invention may be implemented. System 100 shows a video application device 102, a data application device 104, a data delivery device 106, end user 120, end user 122, and ports 108, 110, 112, 114, 116, and 118. Video application device 102, data application device 104, end user 120, and end user 122 are all coupled with data delivery device 106. Further, each port from ports 108 through 118 includes a system port buffer. Also, each system port buffer can include a plurality of queues, and each queue has an associated counter, e.g., a tail drop counter.

Figure 2:
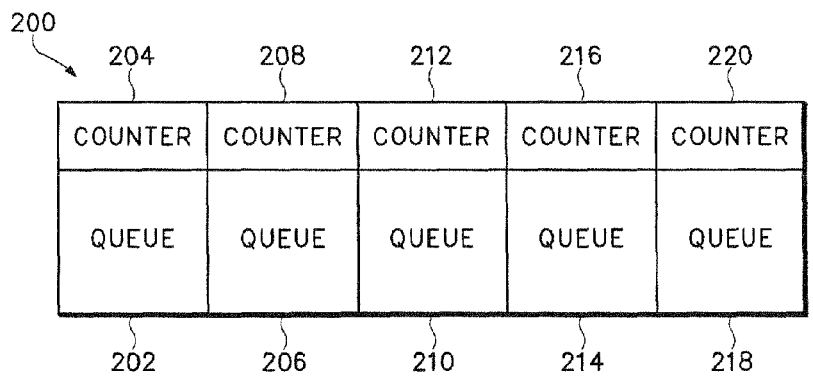
FIG. 2 illustrates an exemplary system port buffer, in accordance with an embodiment of the present invention.

Further, an exemplary system port buffer is illustrated in FIG. 2. System port buffer 200 includes queue 202 and its associated counter 204, queue 206 and its associated counter 208, queue 210 and its associated counter 212, queue 214 and its associated counter 216, and queue 218 and its associated counter 220. An individual queue can be designed to receive data packets from a specific application program device, such as video application device 102 or data application device 104.

Also, although system 100 is shown and described as having certain numbers and types of elements, the present invention is not so limited; that is, system 100 may include elements other than those shown, and may include more than one of the elements that are shown. For example, system 100 can include a greater or fewer number of application devices than the two (video application device 102 and data application device 104) shown.

In one example, video application device 102 and data application device sends data packets to data delivery device 106, e.g., a switch. And delivery device 106 duplicates the data packets to multicast. In the present example, data packets from video application 102 and data application device 104 are duplicated hundreds of times and forwarded to ports 108 through 118 to be sent to end users such as end user 120 and 122. In one embodiment, the data packets overload the system port buffers of port 108 and port 110. Thus, subsequent incoming data packets to port 108 and port 110 may be dropped. In the present embodiment, the counters for the system port buffer are scanned. The associated counters count the number of dropped packets for an individual queue of the system port buffer, and if the number of dropped packets is greater than a predetermined number, e.g., zero, a message is generated. A message can be, for example, a SYSLOG or a Simple Network Management Protocol trap.

Further, in one embodiment, subsequent incoming data packets for the queue are forwarded into a different system port buffer if the number of dropped data packets for the queue is greater than the predetermined number. Also, the source of the subsequent incoming data packets for the queue may be determined. Additionally, it is understood that forwarding can be implemented in many ways. In one example, forwarding comprises utilizing a Switched Port Analyzer feature.

In another embodiment, the plurality of data packets is forwarded into a network analysis module (NAM), wherein the forwarding for a queue is terminated if the number of dropped data packets for the queue is greater than a predetermined number. Moreover, the network analysis module is accessed and the source of data packets for the queue that immediate precede termination of the forwarding may be determined.

Figure 3:
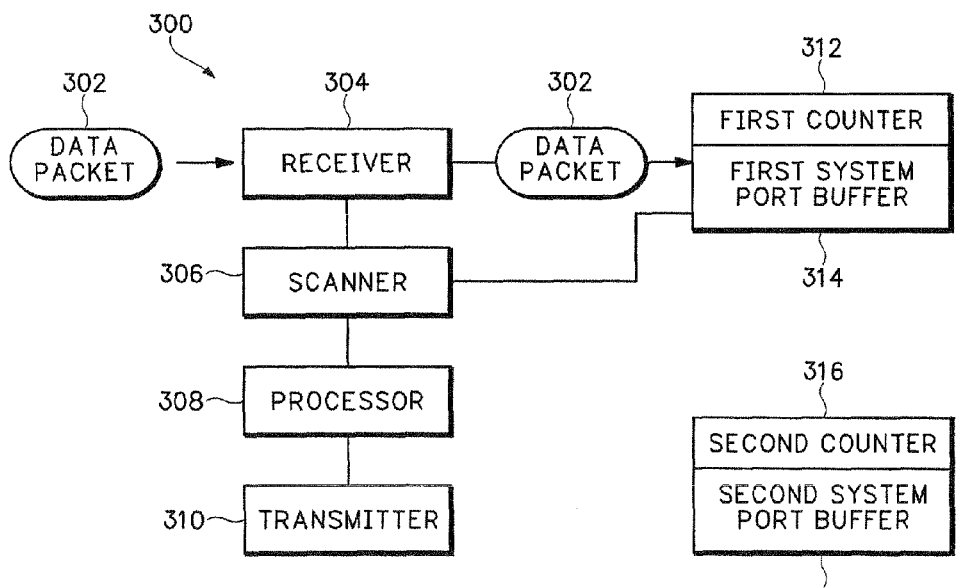
FIG. 3 illustrates a block diagram of an example of a port buffer monitoring system upon which embodiments in accordance with the present invention may be implemented.

FIG. 3 illustrates a block diagram of an example of a port buffer monitoring system 300 upon which embodiments in accordance with the present invention may be implemented.

Although port monitoring system 300 is shown and described as having certain numbers and types of elements, the present invention is not so limited; that is, system 300 may include elements other than those shown, and may include more than one of the elements that are shown. For example, port monitoring system 300 can include a greater number of system port buffers than the two (first system port buffer 314 and second system port buffer 318) shown.

Port buffer monitoring system 300 includes data packet 302, receiver 304 for receiving data packets, scanner 306 for scanning counters, processor 308, transmitter 310 for forwarding data packets, first system port buffer 314, which includes first counter 312, and second system port buffer 318, which includes second counter 316.

Receiver 304 and scanner 306 are coupled with first counter 312. Also, receiver 304 is coupled with scanner 306, scanner 306 is coupled with processor 308, and processor 308 is coupled with transmitter 310. Further, transmitter 310 is communicatively coupled with second system port buffer 318. Moreover, in another embodiment, receiver 304, scanner 306, processor 308, and transmitter 310 can all be coupled together via a bus (not shown).

In one embodiment, upon receiving data packet 302, receiver 304 sends data packet 302 towards first system port buffer 314. In this embodiment, the first system port buffer 314 is unable to receive data packet 302. Consequently, data packet 302 is dropped and first counter 312 registers the dropping of data packet 302. Scanner 306 scans first counter 312 and sends the number of dropped data packets, e.g., one data packet, to processor 308. Processor 308 determines that the number of dropped data packets is greater than a predetermined number, e.g., zero, and generates a message, e.g., a SYSLOG message. Also, any subsequently received data packets may be forwarded towards second system port buffer 318 by transmitter 310. If second system port buffer 318 is able to receive data packets immediately subsequent to the dropped data packet, the source of the dropped data packet may be determined.

Figure 4:
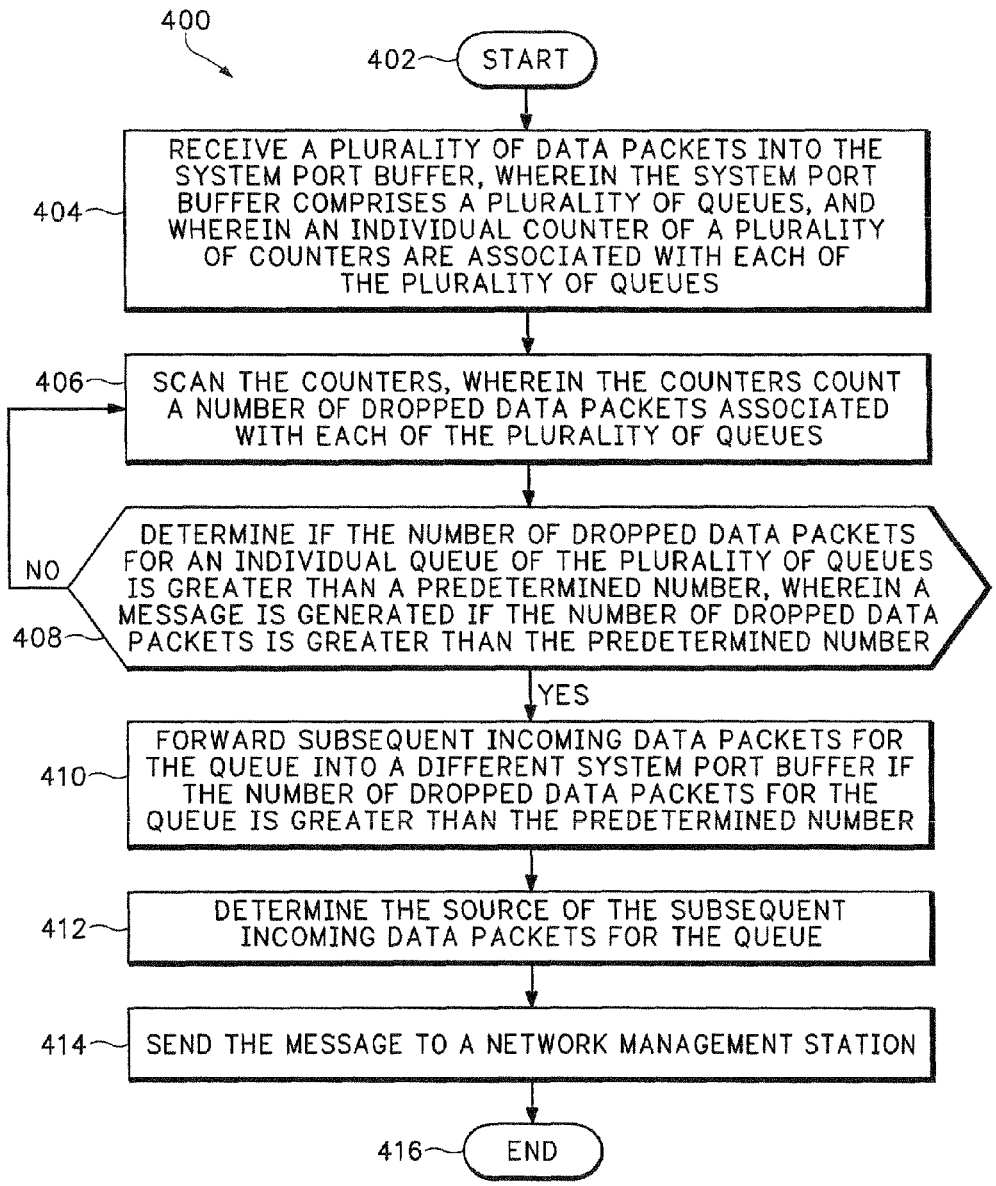
FIG. 4 is a flow chart of a method of using counters to monitor a system port buffer, according to one embodiment of the present invention. The method includes forwarding subsequent incoming data packets for the queue received after a predetermined number of data packets for the queue have been dropped into a different system port buffer.

FIG. 4 is a flow chart 400 of a method of using counters to monitor a system port buffer, according to one embodiment of the present invention. The method includes forwarding subsequent incoming data packets for the queue received after a predetermined number of data packets for the queue have been dropped into a different system port buffer.

Although specific steps are disclosed in flowchart 400, such steps are exemplary. That is, embodiments of the present invention are well suited to performing various other or additional steps or variations of the steps recited in flowchart 400. It is appreciated that the steps in flowchart 400 may be performed in an order different than presented.

At block 402, the process starts.

At block 404, a plurality of data packets is received into the system port buffer, wherein the system port buffer comprises a plurality of queues, and wherein an individual counter of a plurality of counters, e.g., a tail drop counter, are associated with each of the plurality of queues.

At block 406, the counters are scanned, wherein the counters count a number of dropped data packets associated with each of the plurality of queues. In one embodiment, the counters are scanned simultaneously. In another embodiment, the counters are scanned serially.

At block 408, it is determined if the number of dropped data packets for an individual queue of the plurality of queues is greater than a predetermined number, e.g., zero, wherein a message is generated if the number of dropped data packets is greater than the predetermined number. If the number of dropped data packets for a queue is less than the predetermined number, then the associated counter is subsequently rescanned. A message can be, for example, a SYSLOG or a Simple Network Management Protocol trap.

At block 410, subsequent incoming data packets for the queue are forwarded into a different system port buffer if the number of dropped data packets for the queue is greater than the predetermined number. Additionally, it is understood that forwarding can be implemented in many ways. In one example, forwarding comprises utilizing a Switched Port Analyzer feature.

At block 412, the source of the subsequent incoming data packets for the queue is determined. In one example, a processor, e.g., a central processing unit (CPU), utilizes information from the data packet and performs a set of instructions to determine its source.

At block 414, the message is sent to one or more network management station(s). The network management station may, in one embodiment, be programmed to take responsive actions.

At block 416, the process ends.

Figure 5:
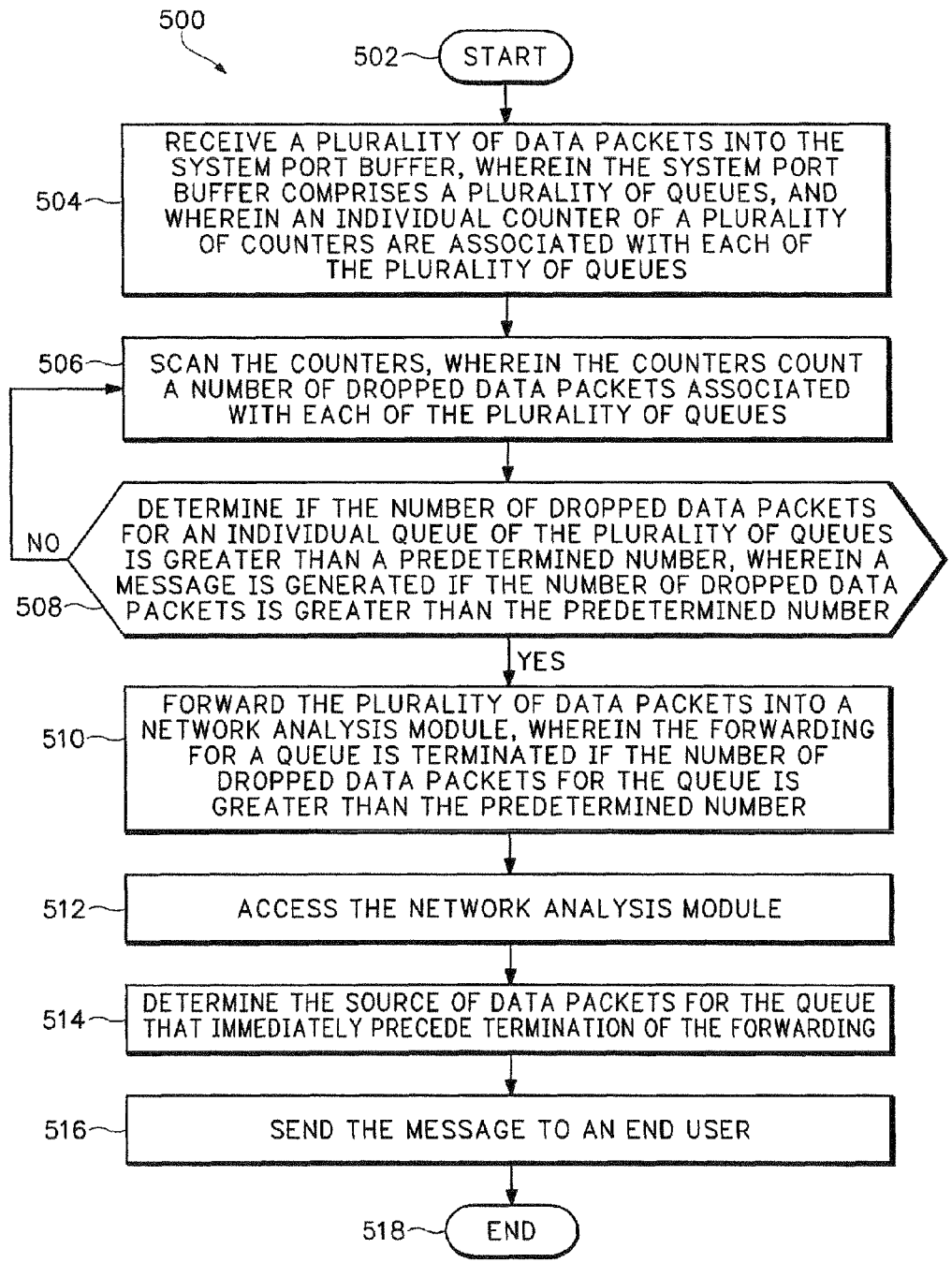
FIG. 5 is a flow chart of a method of using counters to monitor a system port buffer, according to one embodiment of the present invention. The method includes forwarding the plurality of data packets into a network analysis module, wherein the forwarding for a queue is terminated if the number of dropped data packets for the queue is greater than a predetermined number.

FIG. 5 is a flow chart 500 of a method of using counters to monitor a system port buffer, according to one embodiment of the present invention. The method includes forwarding the plurality of data packets into a network analysis module, wherein the forwarding for a queue is terminated if the number of dropped data packets for the queue is greater than a predetermined number.

Although specific steps are disclosed in flowchart 500, such steps are exemplary. That is, embodiments of the present invention are well suited to performing various other or additional steps or variations of the steps recited in flowchart 500. It is appreciated that the steps in flowchart 500 may be performed in an order different than presented.

At block 502, the process starts.

At block 504, a plurality of data packets is received into the system port buffer, wherein the system port buffer comprises a plurality of queues, and wherein an individual counter of a plurality of counters are associated with each of the plurality of queues.

At block 506, the counters are scanned, wherein the counters count a number of dropped data packets associated with each of the plurality of queues.

At block 508, it is determined if the number of dropped data packets for an individual queue of the plurality of queues is greater than a predetermined number, e.g., zero, wherein a message is generated if the number of dropped data packets is greater than the predetermined number. If the number of dropped data packets for a queue is less than the predetermined number, then the associated counter is subsequently rescanned. In addition, it is understood that a message can be, for example, a SYSLOG or a Simple Network Management Protocol trap.

At block 510, the plurality of data packets is forwarded into a network analysis module, wherein the forwarding for a queue is terminated if the number of dropped data packets for the queue is greater than the predetermined number. Moreover, it is understood that forwarding can be implemented in many ways. In one example, forwarding comprises utilizing a Switched Port Analyzer feature.

At block 512, the network analysis module is accessed. Accessing can be implemented in a many ways. In one example, accessing involves transferring information from the network analysis module before reading the information. In another example, information is read directly from the network analysis module.

At block 514, the source of data packets for the queue that immediate precede termination of the forwarding is determined. In one example, a processor, e.g., a central processing unit (CPU), utilizes information from the data packet and performs a set of instructions to determine its source.

At block 516, the message is sent to an end user, e.g., a network manager. Also, it is understood that the message can be sent to other users, devices, and/or other application programs.

At block 518, the process ends.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A non-transitory computer readable storage media encoded with software comprising computer executable instructions and when the software is executed operable to:
monitor a counter associated with a packet buffer queue, wherein the counter is configured to count and record number of a dropped data packets of the packet buffer queue;
forward incoming data packets to a network analysis module (NAM);
determine that the number of dropped packets for the packet buffer queue exceeds a predetermined number;
terminate forwarding based on the determination;

access the NAM to determine a source of a data packet forwarded from the packet buffer queue that immediately precedes the termination of forwarding; and identify that the source of the immediately preceding data packet is a same source of the dropped data packets by inferring that the immediately preceding data packet originates from a same source as the source of the dropped packets.

2. The non-transitory computer readable storage media of claim 1, wherein when the software is executed is further operable to generate a message if the number of dropped packets is greater than the predetermined number, wherein the forwarding to the NAM is terminated responsive to the message.

3. The non-transitory computer readable storage media of claim 1, wherein when the software is executed is further operable to automatically execute a corrective action corresponding to the immediately preceding data packet.

4. The non-transitory computer readable storage media of claim 3, wherein the corrective action is configured to reduce the number of packets dropped by the packet buffer queue.

5. The non-transitory computer readable storage media of claim 1 wherein when the software is executed is further operable to:
forward the incoming data packets to the NAM via a Switched Port Analyzer (SPAN) session, wherein terminating forwarding the data packets comprises disabling the SPAN session.

6. The non-transitory computer readable storage media of claim 2 wherein when the software is executed is further operable to determine network traffic enqueued in the buffer at the time of buffer overflow based on the message.

7. A method comprising:
forwarding incoming data packets to a network analysis module (NAM);
determining that a number of dropped packets for a first packet buffer queue exceeds a predetermined number;
identifying a second packet buffer queue that is not overloaded wherein if the second packet buffer queue is identified then:
forwarding subsequent incoming data packets to the second packet buffer queue;
accessing source information for the subsequent incoming data packet; and
identifying that the source of the subsequent incoming data packet is a same source of the dropped data packets by inferring that the immediately preceding data packet originates from a same source as the source of the dropped packets;
wherein if the second packet buffer queue is not identified then terminating forwarding of the data packets to the NAM based on the determination that the number of dropped packets for a first packet buffer queue exceeds the predetermined number.

8. The method of claim 7, wherein if the second packet buffer queue is not identified further comprising:
accessing the NAM for determining a source of a data packet forwarded from the packet buffer queue that immediately precedes the termination of forwarding; and
inferring that the source of the immediately preceding data packet is a same source of the dropped data packets.

9. The method of claim 8, further comprising:
forwarding the incoming data packets to the NAM via a Switched Port Analyzer (SPAN) session, wherein terminating forwarding the data packets comprises disabling the SPAN session.

10. The method of claim 7, further comprising generating a message responsive to determining that the number of dropped packets for a first packet buffer queue exceeds the predetermined number, wherein the message is a SYSLOG or a Simple Network Management Protocol trap, or combinations thereof.

11. The method of claim 7, further comprising forwarding the incoming data packets to the NAM or the second packet buffer queue, or combinations thereof via a Switched Port Analyzer (SPAN) session, wherein terminating forwarding the data packets to the NAM comprises disabling the SPAN session.

12. The method of claim 7, further comprising wherein if the second packet buffer queue is identified then:
accessing information from the subsequent incoming data packet to determine the source of the subsequent incoming data packet.

13. The method of claim 10, further comprising forwarding the message to a network management station configured to respond to the message by taking a responsive action corresponding to the identified source.

14. An apparatus comprising:
one or more processors; and
a memory coupled to the one or more processors comprising instructions executable by the processors, the processors when executing the instructions configured to:
monitor a counter associated with a packet buffer queue, wherein the counter is configured to count and record number of dropped data packets of the packet buffer queue;
forward incoming data packets to a network analysis module (NAM);
determine that a number of dropped packets for the packet buffer queue exceeds a predetermined number;
terminate forwarding based on the determination;
access the NAM for determining a source of a data packet forwarded from the packet buffer queue that immediately precedes the termination of forwarding; and
identify that the source of the immediately preceding data packet is a same source of the dropped data packets by inferring that the immediately preceding data packet originates from a same source as the source of the dropped packets.

15. The apparatus of claim 14, wherein the processors when executing the instructions configured to read source data corresponding to the immediately preceding data packet received from the NAM to identify the source of the immediately preceding data packet and identify the source of the dropped data packets.

16. The apparatus of claim 14, wherein the processors when executing the instructions configured to read source data corresponding to the immediately preceding data packet directly from the NAM to identify the source of the immediately preceding data packet and identify the source of the dropped data packets.

17. The apparatus of claim 14, wherein the processors when executing the instructions configured to generate a message if the number of dropped packets is greater than the predetermined number, wherein the forwarding to the NAM is terminated responsive to the message.

18. The apparatus of claim 14, wherein the processors when executing the instructions configured to generate a message if the number of dropped packets is greater than the predetermined number, wherein the message is sent to a user terminal.

19. The apparatus of claim 14, wherein the forwarding comprises utilizing a Switched Port Analyzer feature.

20. The apparatus of claim 14, wherein the predetermined number is zero.

* * * * *